United States Patent
Chen et al.

(10) Patent No.: US 7,529,109 B2
(45) Date of Patent: May 5, 2009

(54) DRIVING CIRCUIT FOR SWITCHING DC POWER

(75) Inventors: Kun-Min Chen, Changhua County (TW); Ching-Sheng Li, Hsinchu County (TW); Shiue-Shr Jiang, Changhua County (TW); Shen-Min Lo, Hsinchu (TW); Ming-Jung Tsai, Chang-Hua (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 306 days.

(21) Appl. No.: 11/533,775

(22) Filed: Sep. 21, 2006

(65) Prior Publication Data

US 2007/0297205 A1 Dec. 27, 2007

Related U.S. Application Data

(60) Provisional application No. 60/805,598, filed on Jun. 23, 2006.

(51) Int. Cl.
*H02H 7/122* (2006.01)
*G05F 1/00* (2006.01)
*H02K 21/00* (2006.01)

(52) U.S. Cl. .............. 363/56.08; 323/271; 318/254
(58) Field of Classification Search ............ 363/56.02, 363/56.05, 132, 25, 56.08, 134; 323/271, 323/284, 285; 318/254, 294
See application file for complete search history.

(56) References Cited

U.S. PATENT DOCUMENTS

| | | | | |
|---|---|---|---|---|
| 5,990,644 A | * | 11/1999 | Furuya et al. | 318/293 |
| 6,259,305 B1 | * | 7/2001 | Pakriswamy | 327/424 |
| 7,106,536 B2 | * | 9/2006 | Fang et al. | 360/67 |
| 7,417,817 B1 | * | 8/2008 | Aram et al. | 360/68 |

* cited by examiner

*Primary Examiner*—Jessica Han
*Assistant Examiner*—Emily Pham
(74) *Attorney, Agent, or Firm*—Winston Hsu

(57) ABSTRACT

A driving circuit for switching DC power includes a DC power generator, a bridge circuit, a control signal generator, and a clamping module. The bridge circuit includes a plurality of legs each including an up-bridge switch and a down-bridge switch. The clamping circuit is coupled to each up-bridge switch of the bridge circuit for clamping voltage of an input end of the up-bridge switch.

19 Claims, 16 Drawing Sheets

DRIVING CIRCUIT FOR SWITCHING DC POWER

CROSS REFERENCE TO RELATED APPLICATIONS

This application claims the benefit of U.S. Provisional Application No. 60/805,598, filed on Jun. 23, 2006 and entitled "Voltage Pulse Clamp Technique for Advanced DC Motor" the contents of which are incorporated herein by reference.

BACKGROUND OF THE INVENTION

1. Field of the Invention

The present invention is related to provide a driving circuit for switching direct-current (DC) power, and more particularly, a driving circuit capable of avoiding voltage peaks for protecting circuits and stabilizing system operations.

2. Description of the Prior Art

Motors, indispensable dynamic devices in the industrial society and information age, are used for converting electrical energy into mechanical energy. Some are commonly used, such as direct-current (DC) motors, alternating-current (AC) motors, stepping motors, and so on. Usually, DC motors and AC motors are adopted in products, which need not to be controlled in a precise way, such as fans. Generally, the DC motors rotate by changing current directions and current intensity of rotor coils set on rotors, and the rotors generate magnetic forces interacting with permanent magnets set on stators. Therefore, taking control of the current directions and intensity of the rotor coils controls rotation speed and directions of the motors. However, as time goes by, the faster rotation speed and stronger intensity are demanded, resulting in reliability issues.

Please refer to FIG. 1. FIG. 1 depicts a schematic diagram of a prior art driving circuit 100 of a DC motor. The driving circuit 100 includes transistors 102, 104, 106, and 108, diodes 110, 112, 114, 116, and 130, controllers 118 and 120, resistors 122 and 124, a power generator 132, a capacitor 134, and a Hall Sensor 136. The transistors 102, 104, 106, and 108 are power transistors utilized for driving a full-bridge circuit. Each of the diodes 110, 112, 114, and 116 is coupled between a base and a drain of the transistors 102, 104, 106, and 108. The controllers 118 and 120 control the transistors 102, 104, 106, and 108 to switch on or off according to a sensing result of the Hall sensor 136. The resistors 122 and 124 are seen as pull-high resistors of the transistors 102 and 106 while a resistor 126 and an inductor 128 represent an equivalent circuit of a rotor coil of the DC motor. The diode 130 is utilized for preventing current of the inductor 128 from inversely drifting to the power generator 132, so as to protect the power generator 132. The capacitor 134 is utilized for stabilizing source voltages VM of the transistors 102 and 106, and for absorbing a reverse current.

As shown in FIG. 1, the driving circuit 100 is composed of four solid-state switches split into two paths, or bridges. The transistors 102 and 106 are upper bridge switches, while the transistors 104 and 108 are lower bridge switches. Operations of the driving circuit 100 are as follows. Firstly, the Hall sensor 136 detects a magnetic pole position, N or S, of the rotor of the DC motor. According to the magnetic pole position of the rotor, the controllers 118 and 120 output control signals to each gate of the transistors 102, 104, 106, and 108, so as to control the transistors 102, 104, 106, and 108 to switch on or off. For example, if current flowing from a node 138 to a node 140 is demanded, the controllers 118 and 120 turn off the transistors 104 and 106 and turn on the transistors 102 and 108, then current outputted from the power generator 132 passes through the transistor 102, the node 138, the node 140, and the transistor 108 to ground. On the contrary, if current flowing from the node 138 to the node 140 is demanded, the controllers 118 and 120 turn off the transistors 102 and 108 off and turn on the transistors 104 and 106, then current outputted from the power generator 132 passes through the transistor 106, the node 140, the node 138, and the transistor 104 to ground. Therefore, by controlling the transistors 102, 104, 106, and 108, the controllers 118 and 120 can control the current direction of the rotor coil, so as to control the rotation of the DC motor. However, in the driving circuit 100, switches on the same bridge, such as the transistors 102 and 106, are not allowed being turned on at the same time, or the circuit will become short and seriously break down. Therefore, the switches on the upper or lower bridges are either both off at any time or taking turns by one on and one off. In addition, since the transistors 102, 104, 106, and 108 are solid-state semiconductor devices, switching on or off is conducting or cutting off charge carriers. Note that semiconductors need a carrier recovery time to transit from a conducting state to a cut-off state as well as switch from on to completely off. Therefore, the carrier recovery time needs to be considered in a time sequence of switching operations of the upper bridge switch and the lower bridge switch. An appropriate delay time can be added to the time sequence for avoiding one transistor on the upper or lower bridge switching on while the other is not completely switching off, resulting a short circuit because both transistors on the same bridge are on at the same time. In general, the delay time is named as dead time.

Please refer to FIG. 2 to FIG. 6. FIG. 2 depicts a schematic diagram of a time sequence of corresponding signals of the driving circuit 100. FIG. 3 to FIG. 6 depict schematic diagrams of current paths of the driving circuit 100 in different operating stages. FIG. 2, from top to bottom, shows a sensing result PR_H of the Hall sensor 136, operating states PR_SW1, PR_SW2, PR_SW3, and PR_SW4 of the transistors 102, 104, 106, and 108, a current PR_L of the inductor 128, voltages PR_O1 and PR_O2 of the nodes 138 and 140, and source voltages VM of the transistors 102 and 106. For clearly explanation, operations of the driving circuit 100 can divide into five stages: PR_S1, PR_S2, PR_S3, PR_S4, and PR_S5, as shown in FIG. 2. FIG. 3 shows a current path L1 of in the stage PR_S1, FIG. 4 shows a current path L2 of in the stage PR_S2, FIG. 5 shows a current path L3 of in the stage PR_S3 and the stage PR_S4, and FIG. 6 shows a current path L4 of in the stage PR_S5. The follows explain the operations of the driving circuit 100 in each stage, where FIG. 3 to FIG. 6 only depict partial circuits of the driving circuit 100 for clarity.

Firstly, in the stage PR_S1, the controller 118 and 120 switch on the transistors 102 and 108 and switch off the transistors 104 and 106, so that the voltage PR_O1 of the node 138 is higher than the voltage PR_O2 of the node 140. The current outputted from the power generator 132 flows along the current path L1, from the node 138 to the node 140, so that the current PR_L is positive.

Next, the magnetic pole of the rotor changing with rotations of the DC motor makes the sensing result PR_H of the Hall sensor 136 changed. The stage goes into the stage PR_S2. In the stage PR_S2, the controllers 118 and 120 switch off the transistors 102, 104, and 106 and switch on the transistor 108, so that current of the transistor 108 flows along the current path L2, from the diode 112 to the transistor 108 and ground. Therefore, before the DC motor changes the state, parts of the current PR_L drift to ground through the transistor 108, so as to prevent too much reverse current from drifting into the sources of the transistors 102 and 106.

After undergoing the stage PR_S2, the operation of the driving circuit 100 is forward to the stage PR_S3. At this moment, the controllers 118 and 120 switch all the transistors 102, 104, 106, and 108 off. However, a residual current, flowing along the current path L3, from the diode 112 to the diode 114, increases the voltage VM due to the residual current drifting to the capacitor 134. After that, with stepping forward to the stage PR_S4, the controllers 118 and 120 switch on the transistors 104 and 106 and switch off the transistors 102 and 108, so that the voltage VM continues increasing. The stage PR_S3 mainly functions to stagger the time when the upper bridge and the lower bridge turn on in order to avoid a shoot-through condition.

In the last stage PR_S5, the transistors 104 and 106 are on while the transistors 102 and 108 are off. Therefore, the voltage PR_O1 of the node 138 is low while the voltage PR_O2 of the node 140 is high, and current outputted from the power generator 132 flows along the current path L4 from the node 140 to the node 138, so that the current PR_L is negative, accomplishing the state transition.

In accordance with FIG. 2 to FIG. 5, in the stages PR_S3 and PR_S4, the residual motor current drifts from the diode 112 to the diode 114 and further drifts to the capacitor 134, causing the source voltages VM of the transistors 102 and 106 increasing. Furthermore, when the DC motor rotates in a higher speed, current in the DC motor is larger, so that more reverse currents drift to the capacitor 134, which increases the voltage VM and may break down the full-bridge circuit. The phenomenon decreases the reliability of the device operation. In other words, the prior art driving circuit may cause devices broken down due to the reverse current of the DC motor, further taking away operational functions of the DC motor.

SUMMARY OF THE INVENTION

It is therefore an object of the claimed invention to provide a driving circuit for switching a direct-current (DC) power.

The present invention discloses a driving circuit for switching a direct-current (DC) power, including a DC power generator, a bridge circuit, a control signal generator, and an active clamping module. The DC power generator is used for outputting DC power. The bridge circuit includes a plurality of legs each including an upper-bridge switch and a lower-bridge switch. The upper-bridge switch has an input end coupled to the DC power generator, an output end, and a control end, for conducting power received by the input end to the output end according to a first control signal of a plurality of control signals. The lower-bridge switch has an input end coupled to the output end of the upper-bridge switch, an output end coupled to ground, and a control end, for conducting power received by the input end to the output end according to a second control signal of the plurality of control signals. The control signal generator is used for generating the plurality of control signals for controlling each upper-bridge switch and lower-bridge switch of the bridge circuit. The active clamping module coupled to each upper-bridge switch of the plurality of legs of the bridge circuit for clamping voltages of input ends of the upper-bridge switches.

The present invention further discloses a driving circuit for a direct-current (DC) motor, including a DC power generator, a full bridge circuit, a first resistor, a second resistor, a magnetic sensor, a control signal generator, and an active clamping module. The DC power generator is used for outputting a DC power. The full bridge circuit includes a first upper-bridge switch, a first lower-bridge switch, a second upper-bridge switch, and a second lower-bridge switch. The first upper-bridge switch has an input end coupled to the DC power generator, an output end coupled to a first end of a rotor coil of the DC motor, and a control end, for conducting power received by the input end to the output end according to a first control signal. The first lower-bridge switch has an input end coupled between the input end of the first upper-bridge switch and the first end of the rotor coil of the DC motor, an output end coupled to ground, and a control end, for conducting a power received by the input end to the output end according to a second control signal. The second upper-bridge switch has an input end coupled to the DC power generator, an output end coupled to a second end of the rotor coil of the DC motor, and a control end, for conducting power received by the input end to the output end according to a third control signal. The second lower-bridge switch has an input end coupled between the input end of the second upper-bridge switch and the second end of the rotor coil of the DC motor, an output end coupled to ground, and a control end, for conducting power received by the input end to the output end according to a forth control signal. The first resistor is coupled between the input end and the control end of the first upper-bridge switch while the second resistor is coupled between the input end and the control end of the second upper-bridge switch. The magnetic sensor is used for generating a magnetic pole position sensing signal according to magnetic pole changes of the rotor of the DC motor. The control signal generator is used for generating the first control signal, the second control signal, the third control signal, the third control signal, and the forth control signal according to the magnetic pole position sensing signal generated by the magnetic sensor. The active clamping module is coupled between a node between the control end of the first upper-bridge switch and the second resistor and a node between the control end of the first upper-bridge switch and the second resistor, for clamping voltage of the input end of the first upper-bridge switch and voltage of the input end of the second upper-bridge switch.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
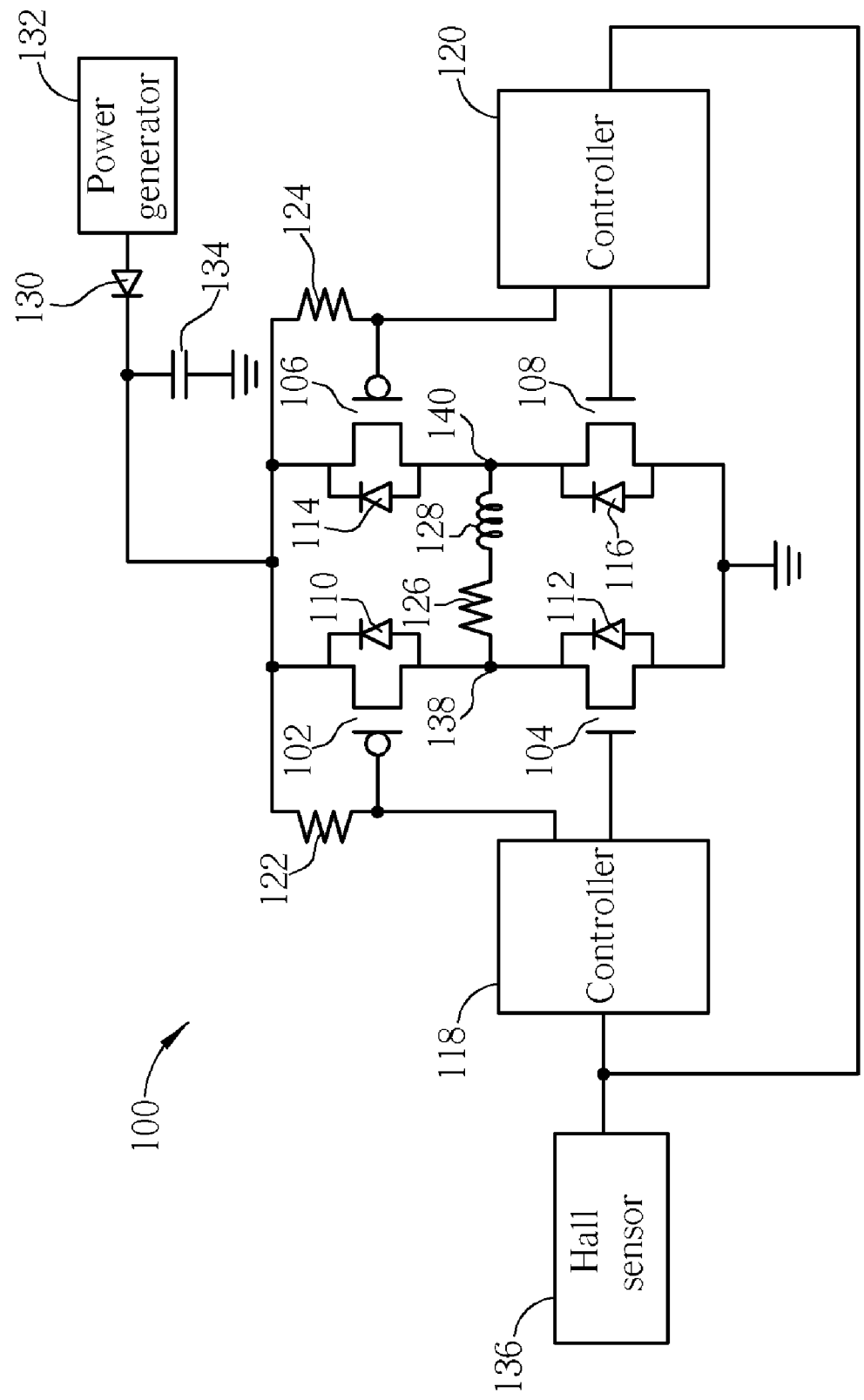
FIG. 1 depicts a schematic diagram of the prior art driving circuit used in a direct-current (DC) motor.
Figure 2:
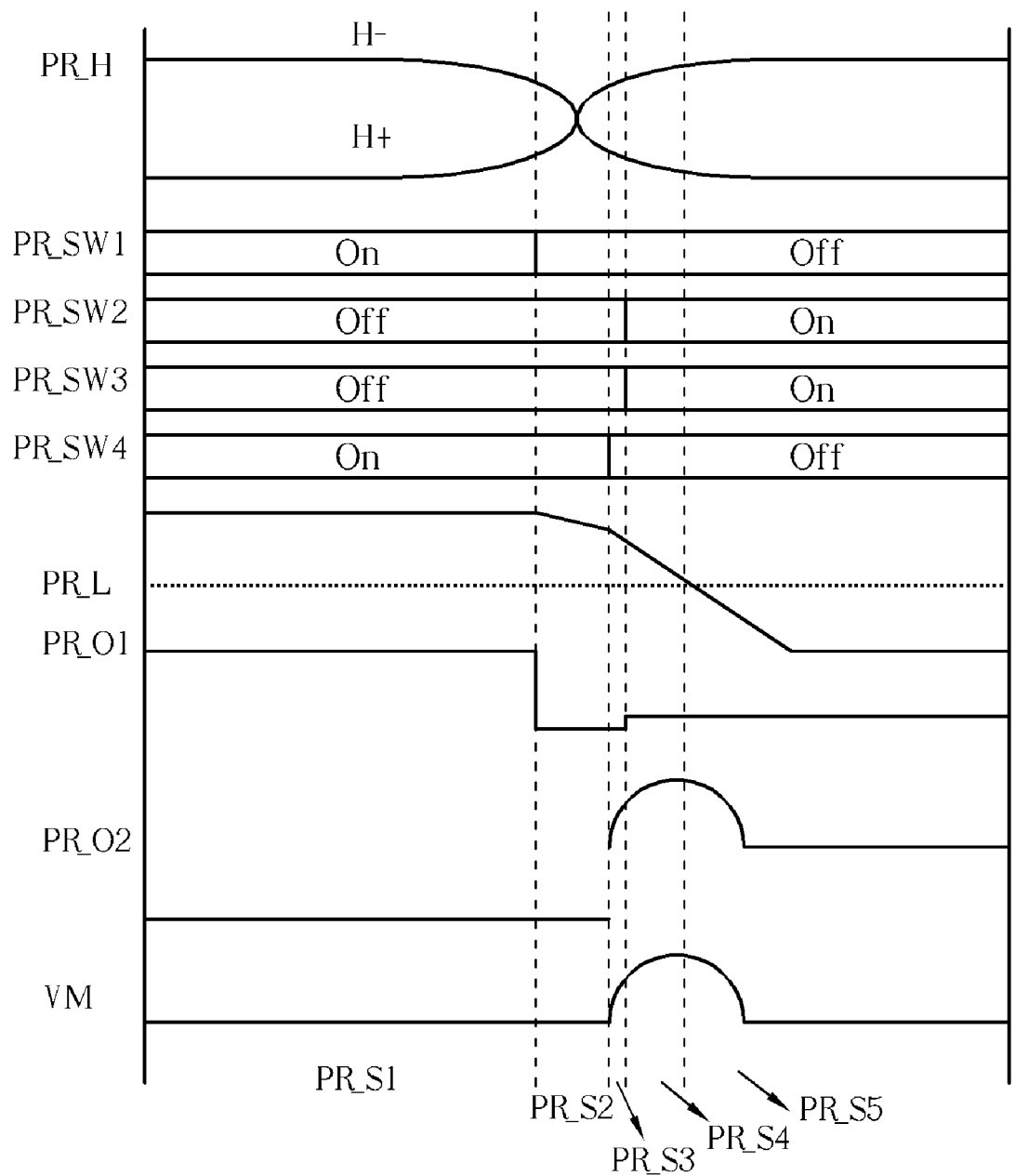
FIG. 2 depicts a schematic diagram of a time sequence of corresponding signals of the driving circuit in FIG. 1.
Figure 3:
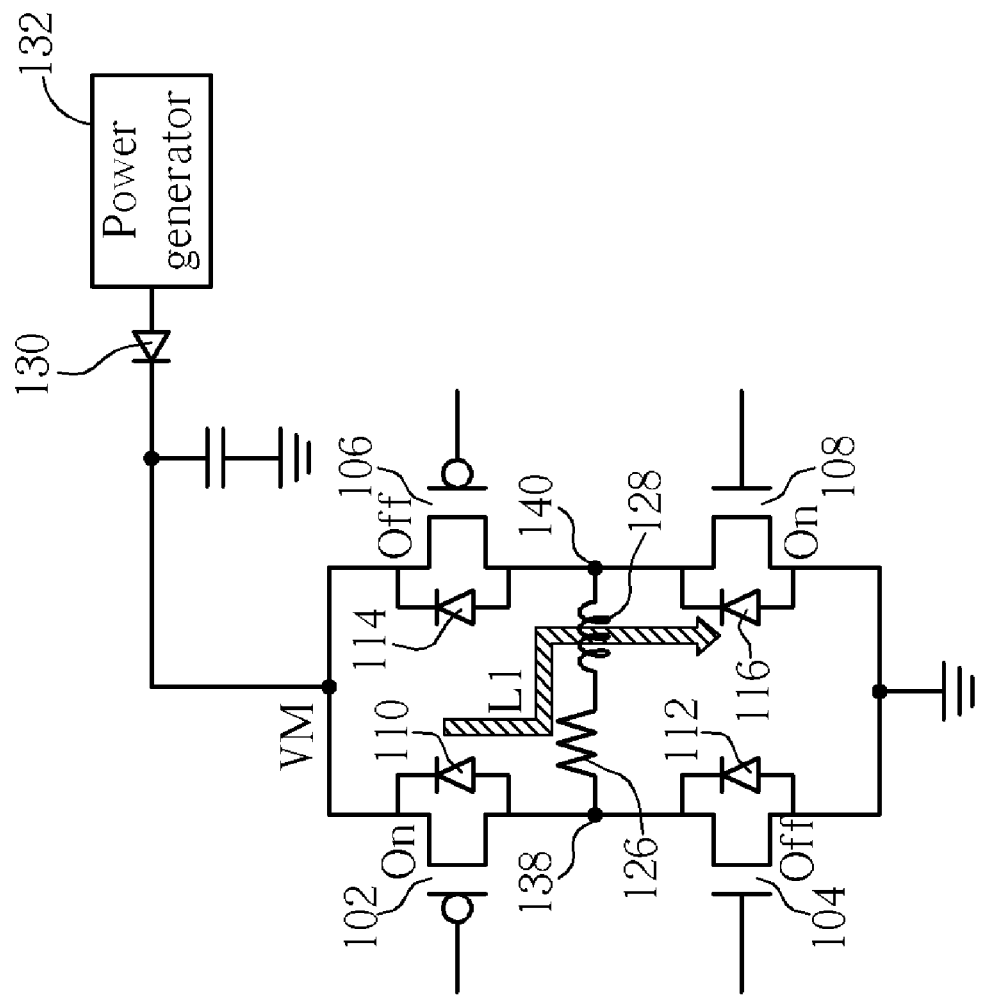
FIG. 3 to FIG. 6 each depicts a schematic diagram of a current path of the driving circuit in FIG. 1 in an operating stage.
Figure 4:
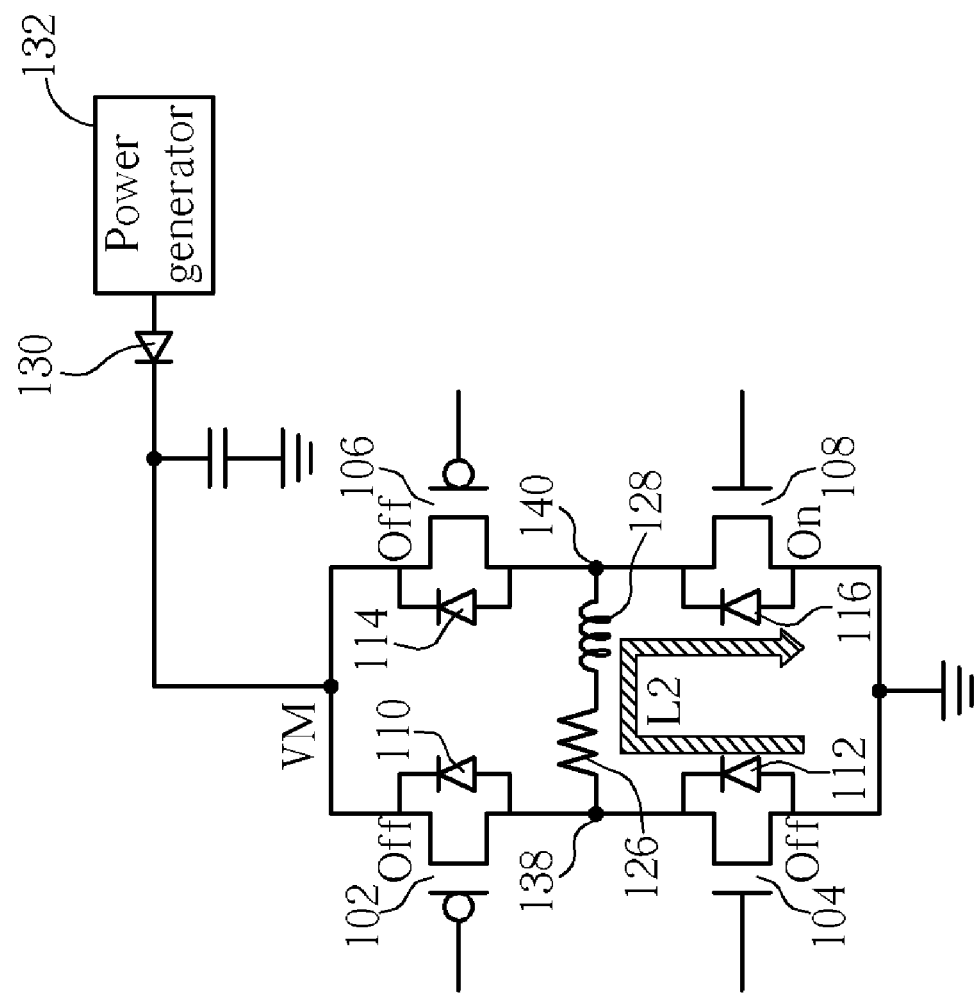
Figure 5:
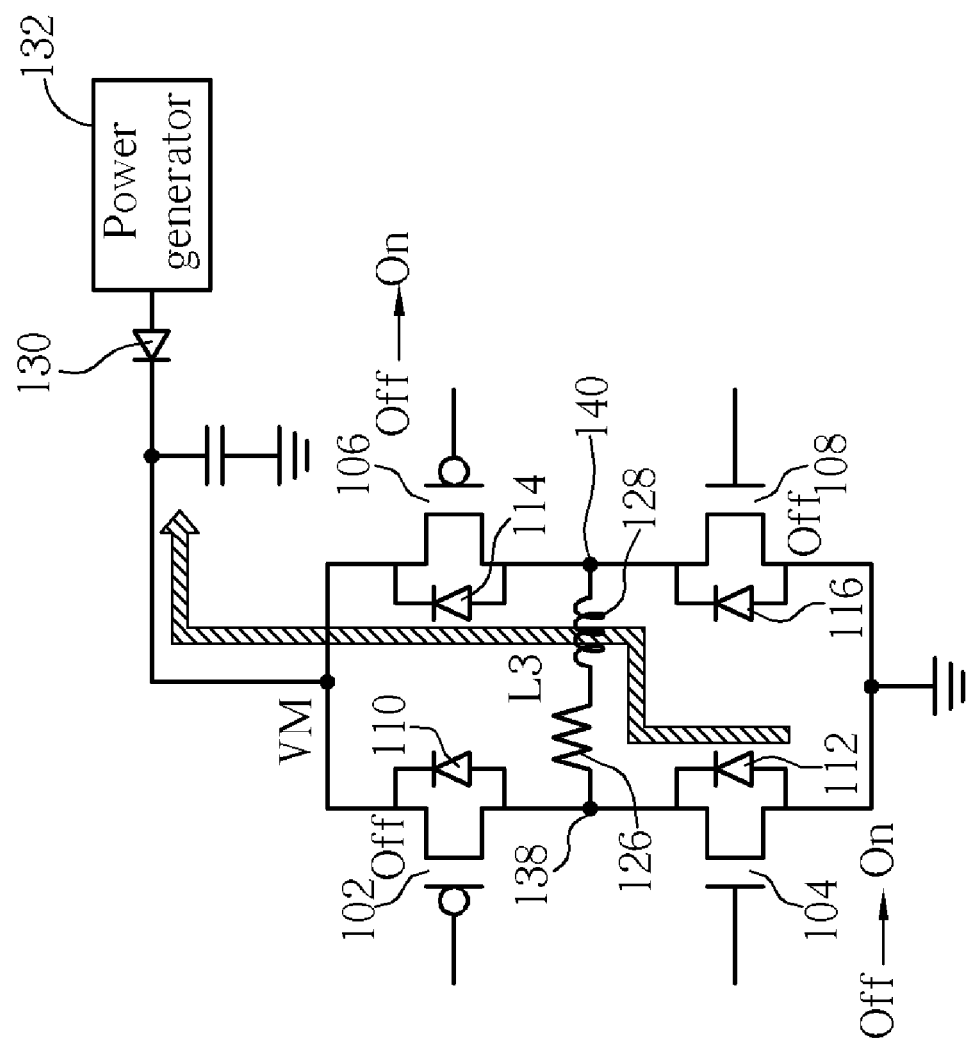
Figure 6:
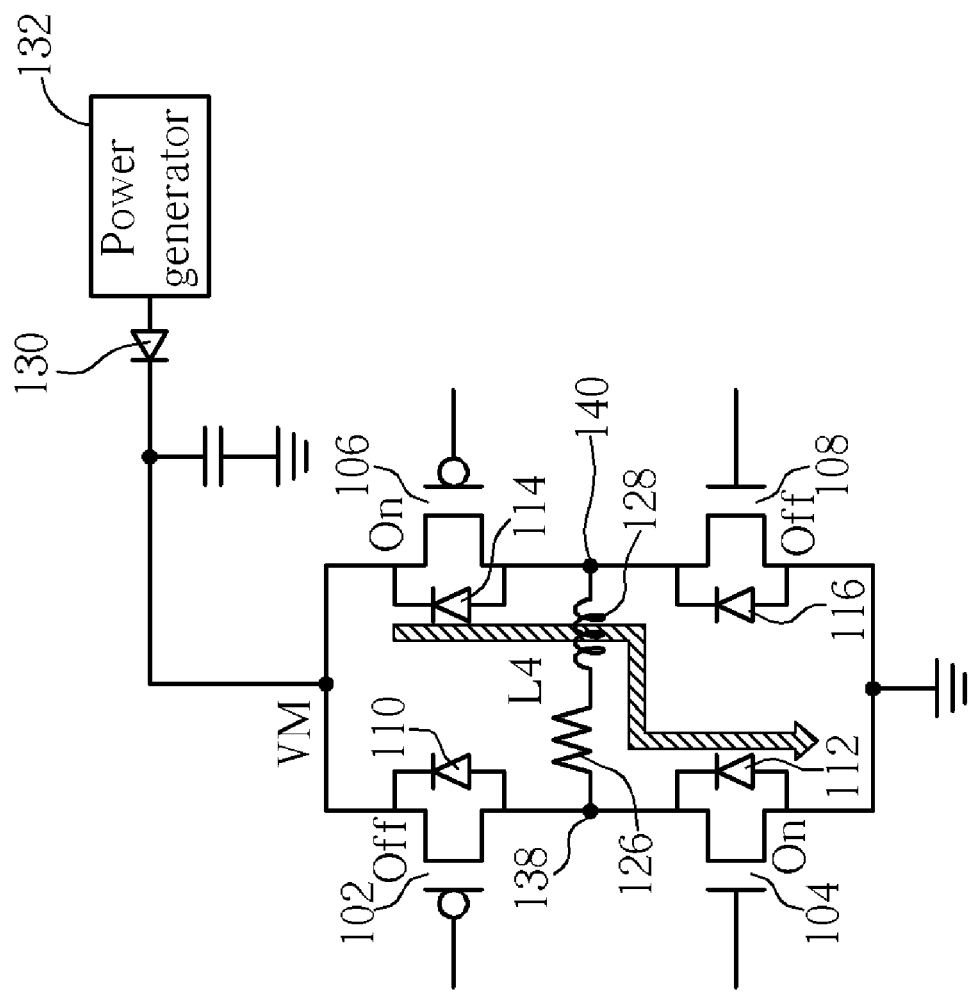
Figure 7:
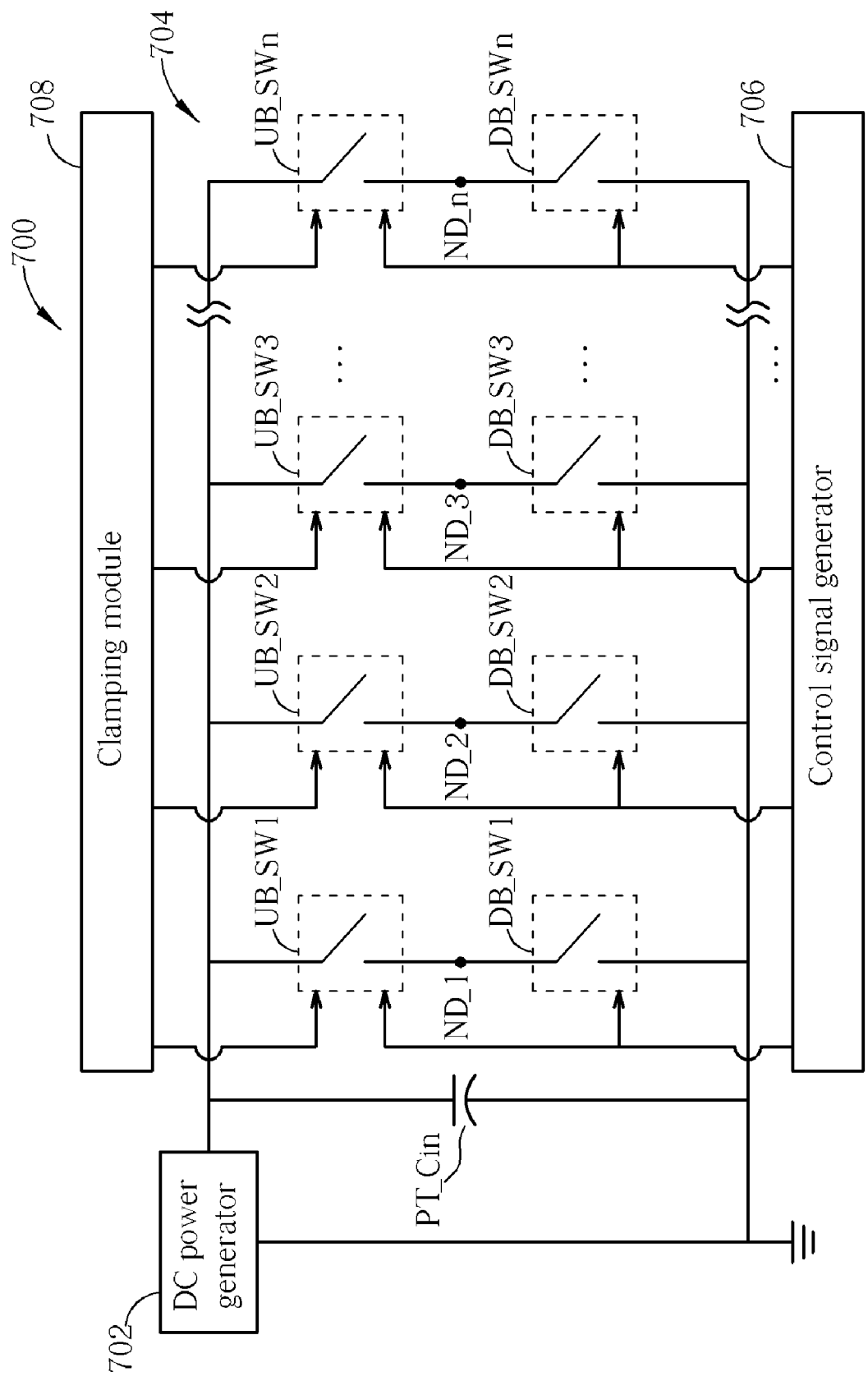
FIG. 7 depicts a schematic diagram of a driving circuit for switching DC power in a first embodiment of the present invention.

Please refer to FIG. 7. FIG. 7 depicts a schematic diagram of a driving circuit 700 for switching DC power in accordance with the first embodiment of the present invention. The driving circuit 700 includes a DC power generator 702, a bridge circuit 704, a control signal generator 706, an active clamping module 708, and a capacitor PT_Cin. The DC power generator 702 is utilized for outputting DC power. The bridge circuit 704 includes upper-bridge switches UB_SW1~UB_SWn and lower-bridge switches DB_SW1~DB_SWn, constructing n bridges. Each of the upper-bridge switches UB_SW1~UB_SWn and the lower-bridge switches DB_SW1~DB_SWn has an input end, an output end, and a control end, for switching on or off according to signals outputted from the control signal generator 706. Therefore, the control signal generator 706 outputs control signals for switching on or off the upper-bridge switches UB_SW1~UB_SWn and the lower-bridge switches DB_SW1~DB_SWn, so as to control electric potentials of nodes ND_1~ND_n. The active clamping module is coupled to the upper-bridge switches UB_SW1~UB_SWn, for clamping each voltage of the input ends of the upper-bridge switches.

In the driving circuit 700, circuits, such as coils or inductors, can additionally be installed between the nodes ND_1~ND_n. Conducting or cutting off the upper-bridge switches UB_SW1~UB_SWn and the lower-bridge switches DB_SW1~DB_SWn can change electric potential differences between the nodes ND_1~ND_n, where the capacitor PT_Cin is used for absorbing a residual reverse current. When the reverse current is large, the voltages of the input ends of the upper-bridge switches UB_SW1~UB_SWn react high. At this moment, the active clamping module 708 clamps each voltage of the input ends of the upper-bridge switches to a predetermined voltage, so that the reverse current does not raise the voltages of the input ends of the upper-bridge switches UB_SW1~UB_SWn, so as to increase reliability. In other words, the driving circuit 700 can avoid the impact of the reverse current, so as to protect circuit devices and stabilize system operations.

In addition, in the driving circuit 700, the control signal module 706 functions to control operational states of the bridge circuit 704. Preferably, the upper-bridge switches UB_SW1~UB_SWn are p-type metal-oxide-semiconductor (MOS) transistors, where each input end of the upper-bridge switches is a source, each output of that is a drain, and each control end of that is a gate. On the contrary, the lower-bridge switches UB_SW1~UB_SWn are preferably n-type metal-oxide-semiconductor (MOS) transistors, where each input end of the lower-bridge switches is a drain, each output of that is a source, and each control end of that is a gate. The active clamping module 708 is utilized for preventing the reverse current from excessively increasing the voltages of the input ends of the upper-bridge switches UB_SW1~UB_SWn, which may cause circuit devices burned down. Certainly, the structure of the active clamping module 708 is not limited to any specific forms but a form capable of efficiently clamping at a suitable voltage.

The driving circuit 700 mainly functions to control the electric potential difference between the nodes ND_1~ND_n, which can apply to many circuits featuring changing current directions, such as inverters, DC motors, and so forth. Take an inverter for example. An inverter utilizes a three-bridge circuit to output three-phase alternating current (AC) power from three nodes on the bridges by continuously switching each upper-bridge and lower-bridge switch of the bridges. Furthermore, take a DC motor for example. A DC motor applies a two-bridge circuit, or a full-bridge circuit, and changes current directions and current intensity of coils on a motor rotor by continuously switching each upper-bridge and lower-bridge switch of the bridges, so as to generate magnetic forces with different strength and different magnetic pole positions. These magnetic forces further interact with a permanent magnet on a motor stator to produce attractive forces or repulsive forces, making the motor rotate. Therefore, controlling the current directions and the current intensity of the rotor coils controls the rotation speed and direction of the DC motor.

Figure 8:
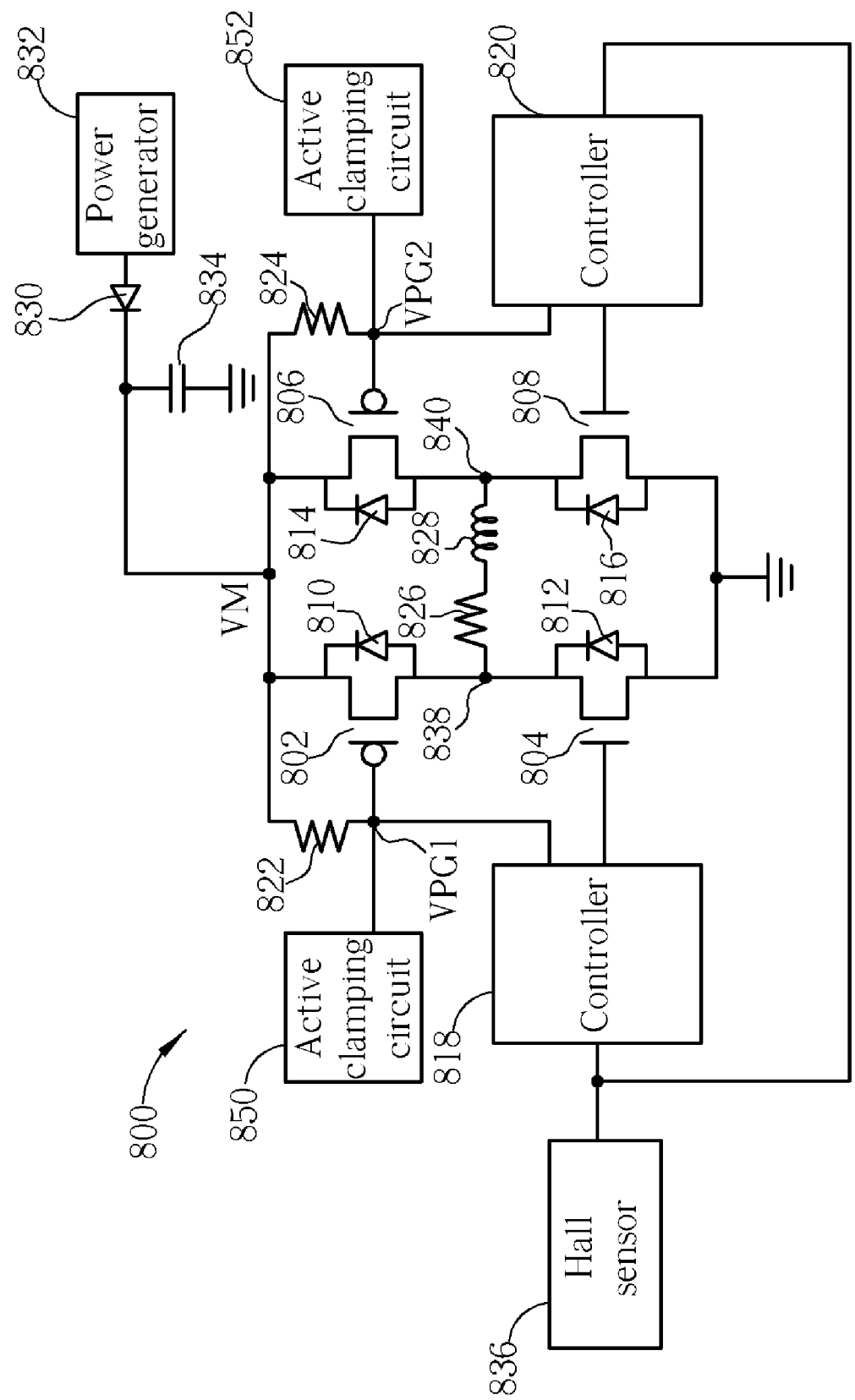
FIG. 8 and FIG. 9 depict schematic diagrams of driving circuits for a DC power in a second embodiment of the present invention.

Please refer to FIG. 8. FIG. 8 depicts a schematic diagram of a driving circuit 800 of a DC motor in accordance with the second embodiment of the present invention. The driving circuit 800 includes transistors 802, 804, 806, and 808, diodes 810, 812, 814, 816, and 830, controller 818 and 820, resistors 822 and 824, a power generator 832, a capacitor 834, a Hall sensor 836, and active clamping circuits 850 and 852. The transistors 802, 804, 806, and 808 are power transistors utilized for driving a full-bridge circuit of the DC motor. Each of the diodes 810, 812, 814, and 816 is coupled between a base and a drain of the transistors 802, 804, 806, and 808, respectively. The controllers 818 and 820 control the transistors 802, 804, 806, and 808 to switch on or off according to a sensing result of the Hall sensor 836. The resistors 822 and 824 are seen as pull-high resistors of the transistors 802 and 806, while a transistor 826 and an inductor 828 represents an equivalent circuit of a rotor coil in the DC motor. The diode 830 is utilized for preventing current of the inductor 828 from inversely drifting to the power generator 832, so as to protect the power generator 132. The capacitor 834 is utilized for stabilizing source voltages VM of the transistors 802 and 806 and for absorbing a reverse current. In addition, the active clamping circuits 850 and 852 are utilized for clamping gate voltages VPG1 and VPG2 of the transistors 802 and 806, so as to prevent a reverse current from continuously charging the capacitor 834.

Operations of the driving circuit 800 are as follows. Firstly, the Hall sensor 836 detects a magnetic pole position, N or S, of the rotor of the DC motor. According to the magnetic pole position of the rotor, the controllers 818 and 820 output control signals to each gate of the transistors 802, 804, 806, and 808, so as to control the transistors 802, 804, 806, and 808 to switch on or off. For example, if current flowing from a node 838 to a node 840 is demanded, then the controllers 818 and 820 turn off the transistors 804 and 806 and turn on the transistors 802 and 808, and current outputted from the power generator 832 passes through the transistor 802, the node 838, the node 840, and the transistor 808 to ground. On the contrary, if current flowing from the node 838 to the node 840 is demanded, then the controllers 818 and 820 turn off the transistors 802 and 808 and turn on the transistors 804 and 806, and current outputted from the power generator 832 passes through the transistor 806, the node 840, the node 838, and the transistor 804 to ground. Therefore, the controllers 818 and 820 can control the current directions of the rotor coil, so as to control the rotation of the DC motor. In the driving circuit 800, the switches on the same upper or lower bridge, such as the transistors 802 and 806, cannot switch on at the same time theoretically, or the circuit will become short and seriously break down. Therefore, the switches on the same upper or lower bridge are either both off at any time or taking turns by one on and one off. However, via the active clamping circuits 850 and 852, the present invention is capable of safely and fitly switching on the upper-bridge switches and the lower-bridge switches at the same time, so as to release the energy of the inductor 828 via a reverse current path at the upper bridges.

Figure 9:
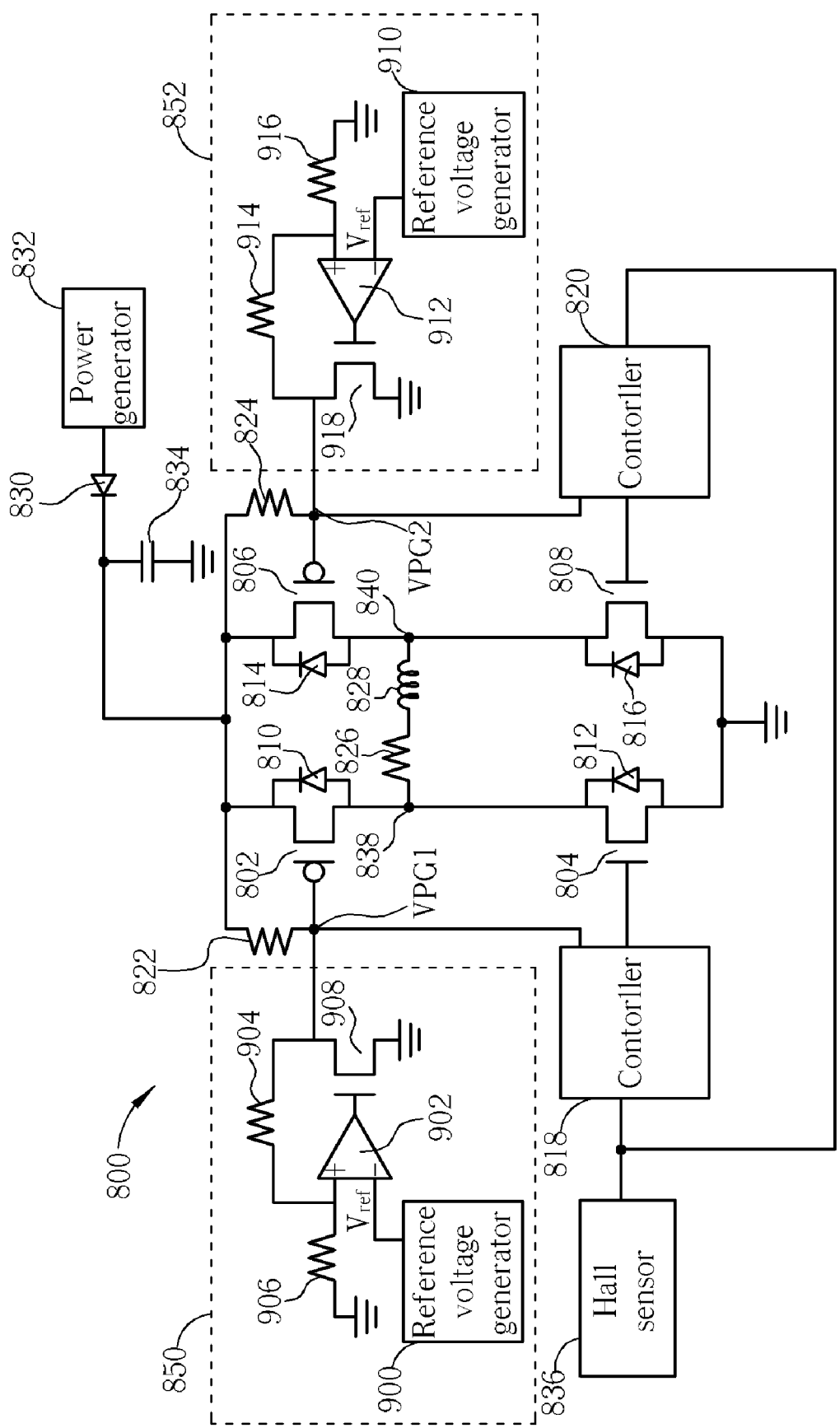

The active clamping circuits 850 and 852 are utilized for preventing a residual current from increasing the source voltages VM of the transistors 802 and 806. The structure of the active clamping circuits 850 and 852 are certainly not limited to any specific forms but a structure capable of efficiently clamping at a suitable voltage. For example, please refer to FIG. 9. In FIG. 9, the active clamping circuit 850 includes a reference voltage generator 900, an operational amplifier 902, voltage dividing resistors 904 and 906, and a transistor 908. Similarly, the active clamping circuit 852 includes a reference voltage generator 910, an operational amplifier 912, voltage dividing resistors 914 and 916, and a transistor 918. In FIG. 9, the active clamping circuits 850 and 852 are negative feedback circuits. After the negative feedback establishes, if reference voltages generated by the reference voltage generators 900 and 902 are Vref, clamping voltages Vclamp of the active clamping circuits 850 and 852 should be Vref*[(Rf1/Rf2)+1], where the clamping voltages Vclamp are predetermined to be lager than VM by adjusting the reference voltages Vref.

Figure 10:
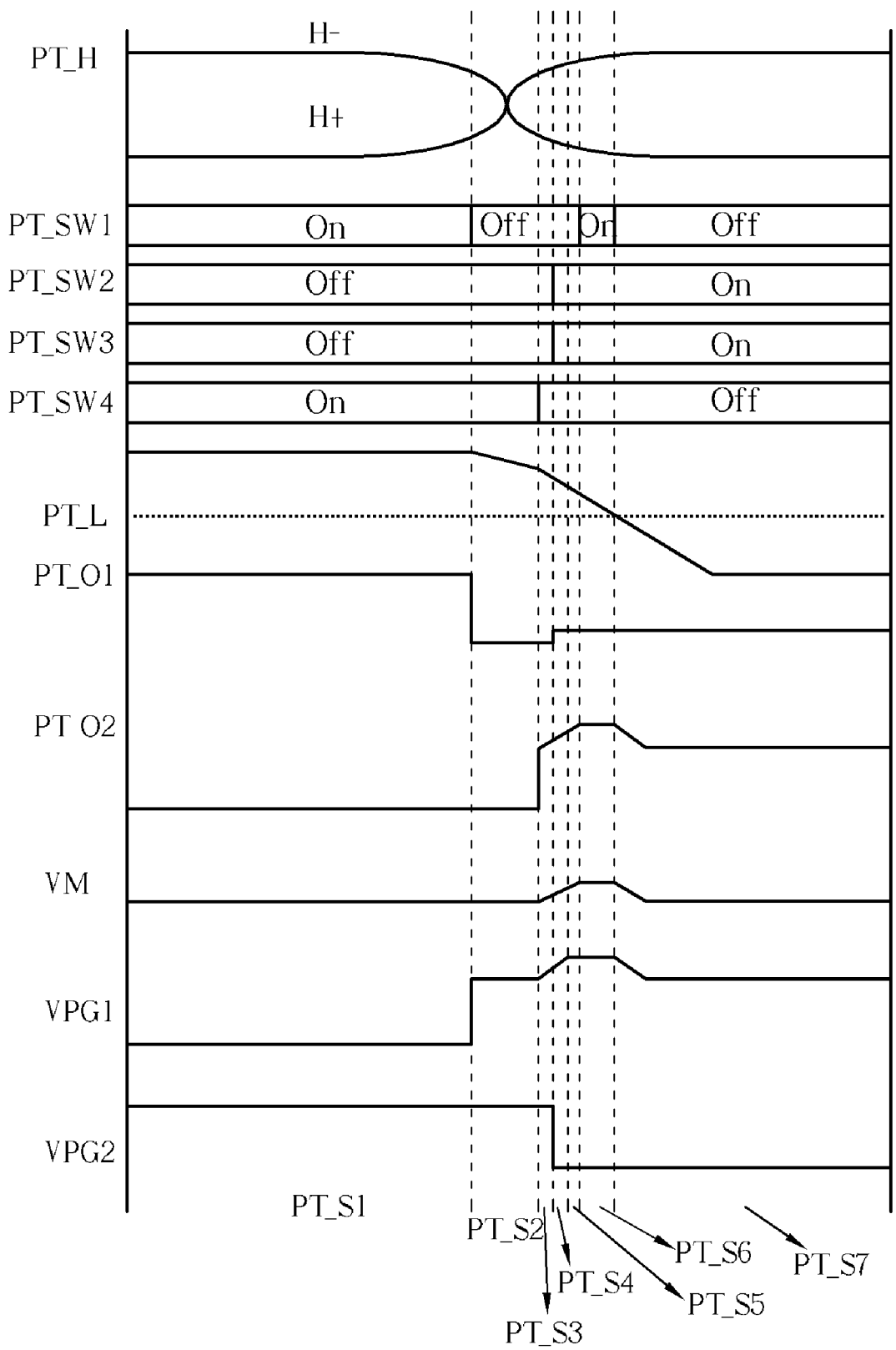
FIG. 10 depicts a schematic diagram of a time sequence of corresponding signals of the driving circuit in FIG. 9.
Figure 11:
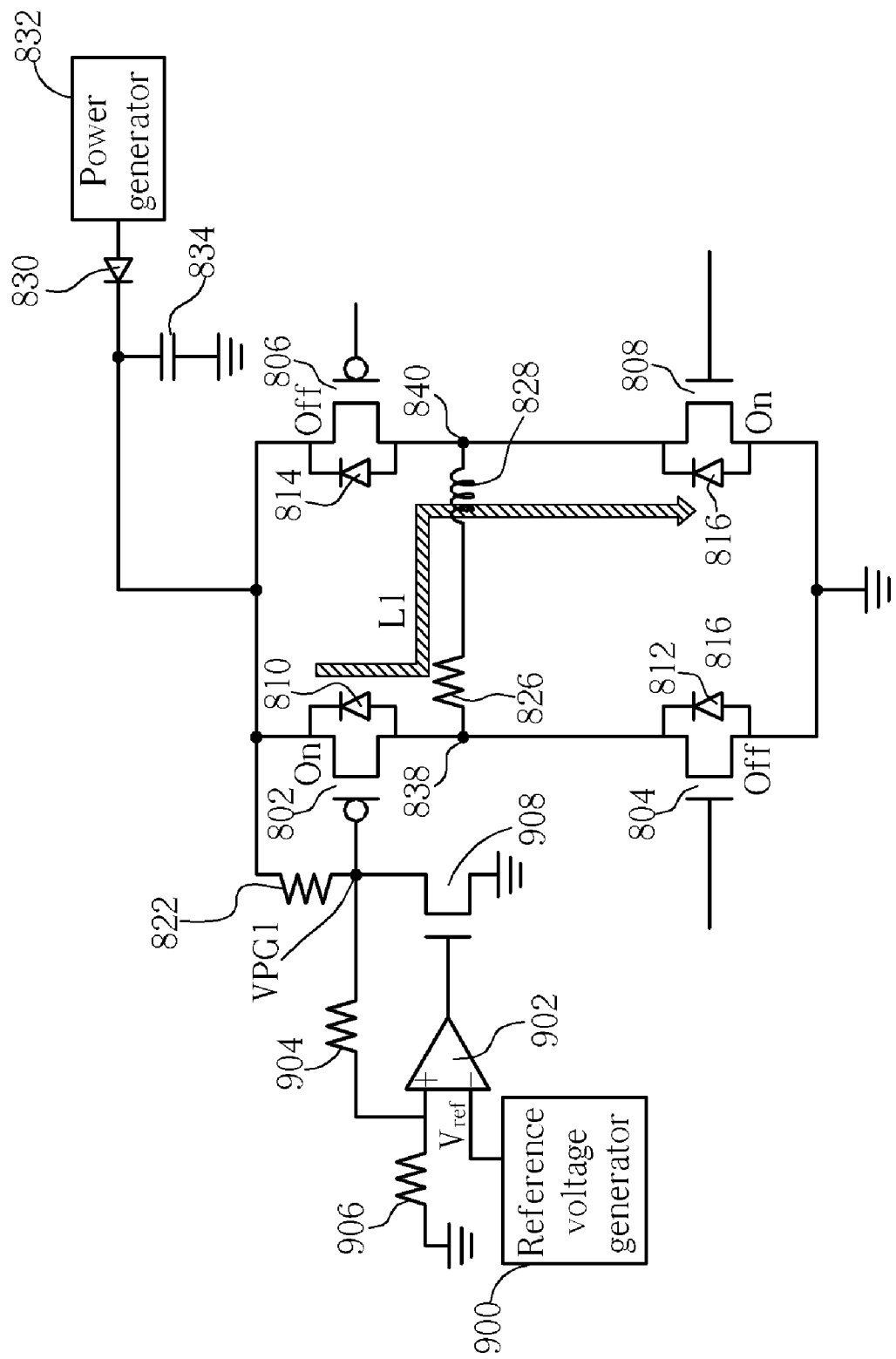
FIG. 11 to FIG. 16 each depicts a schematic diagram of a current path of the driving circuit in FIG. 9 in an operating stage.
Figure 12:
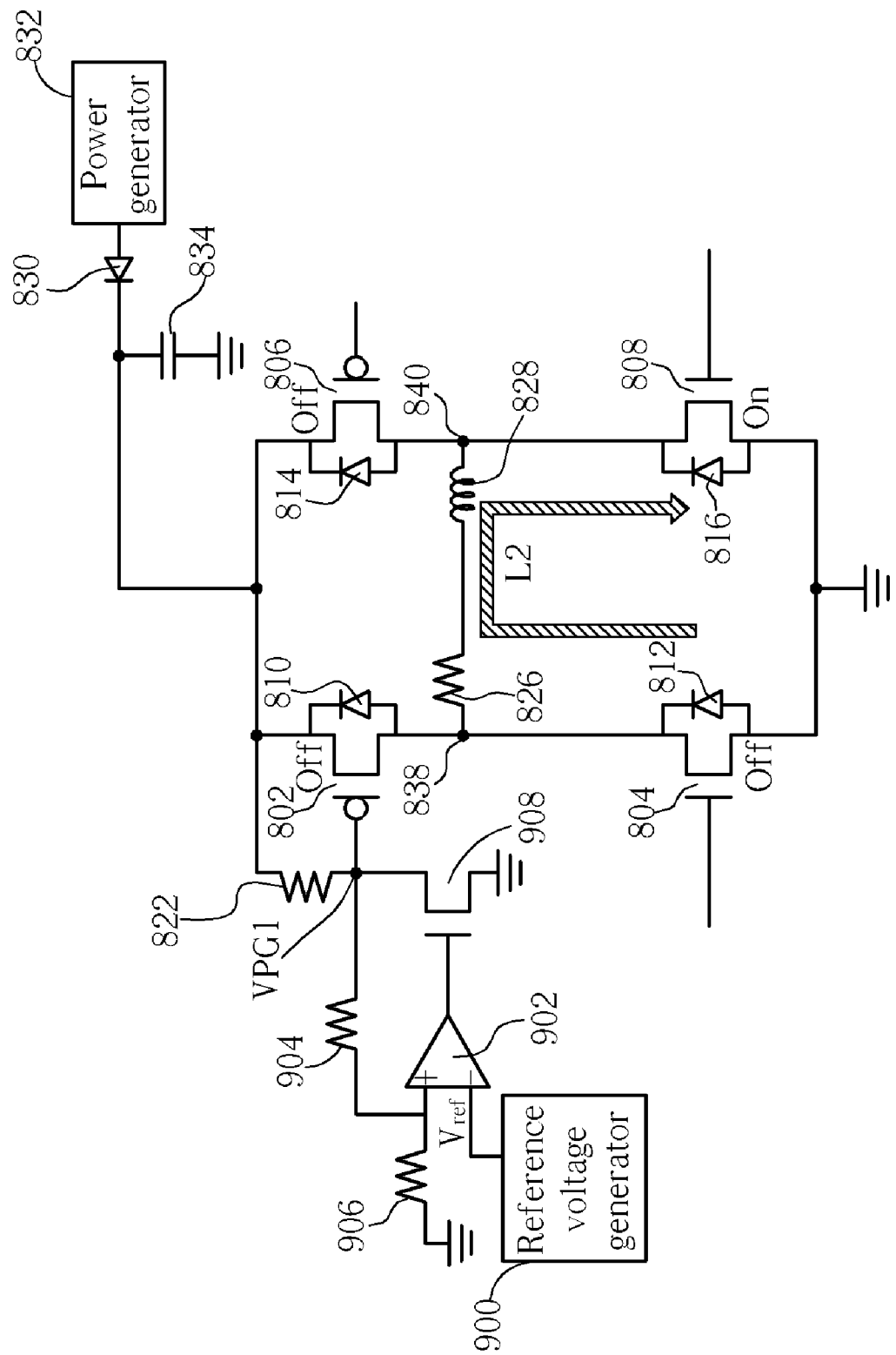
Figure 13:
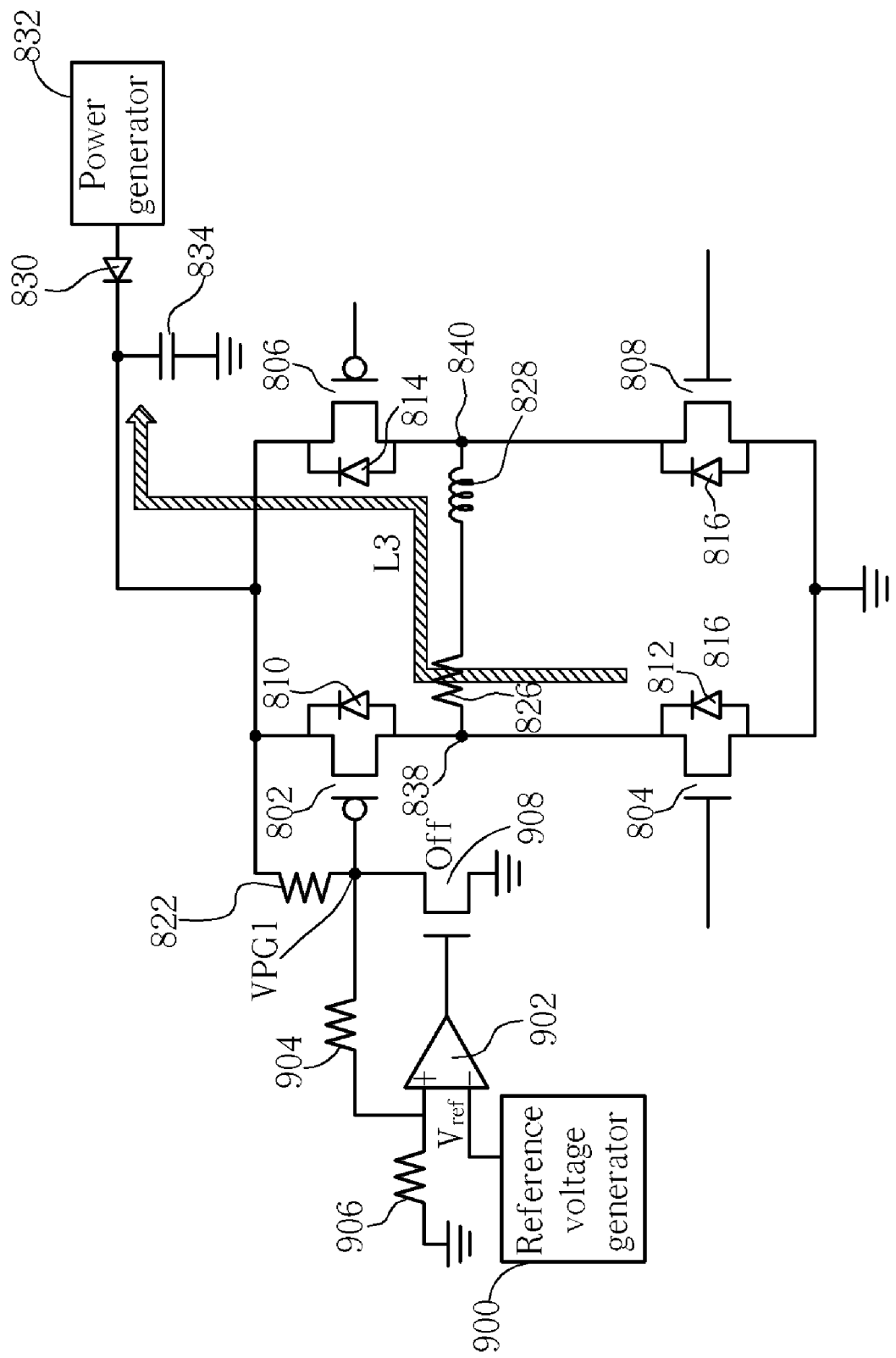
Figure 14:
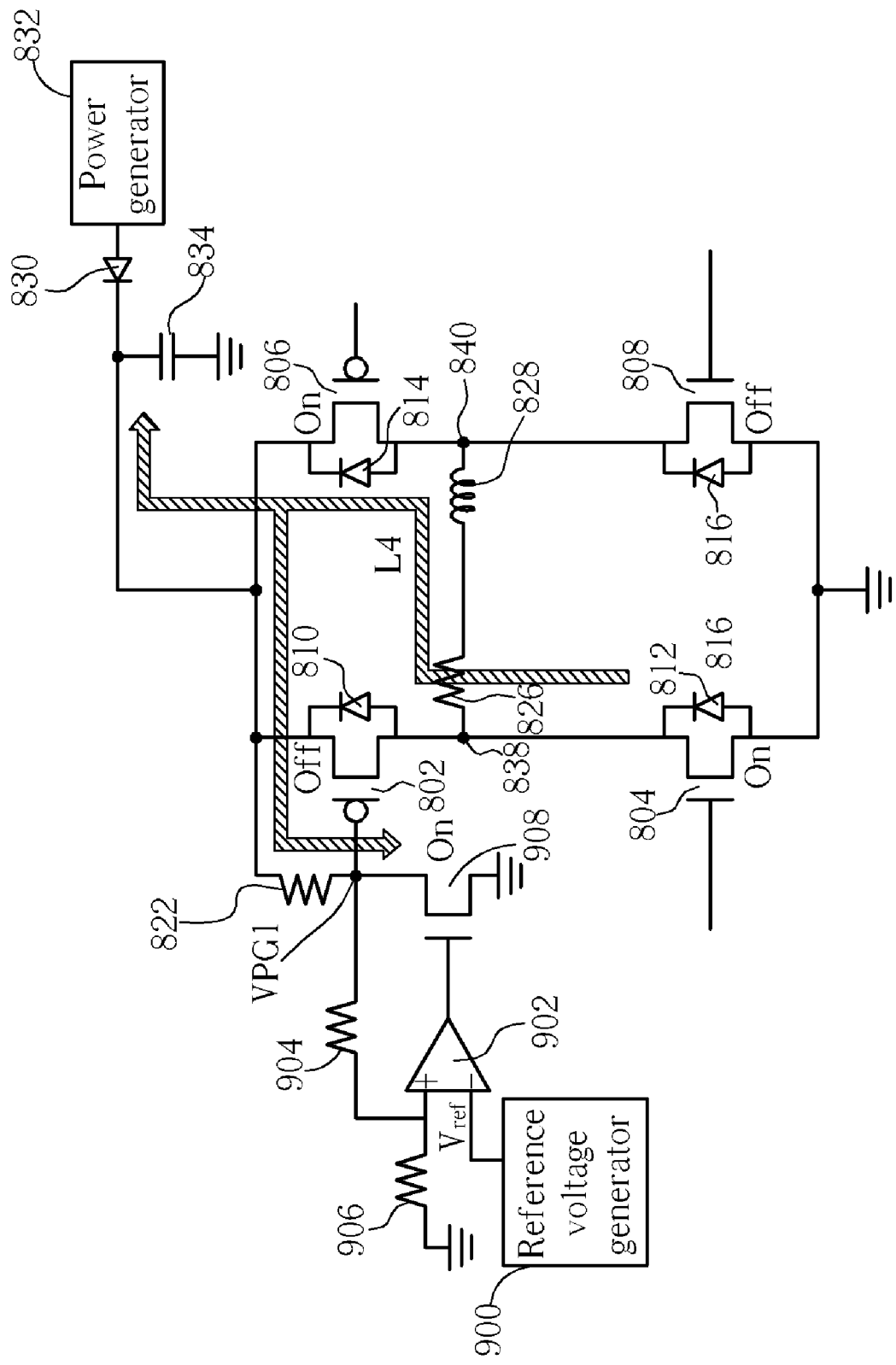
Figure 15:
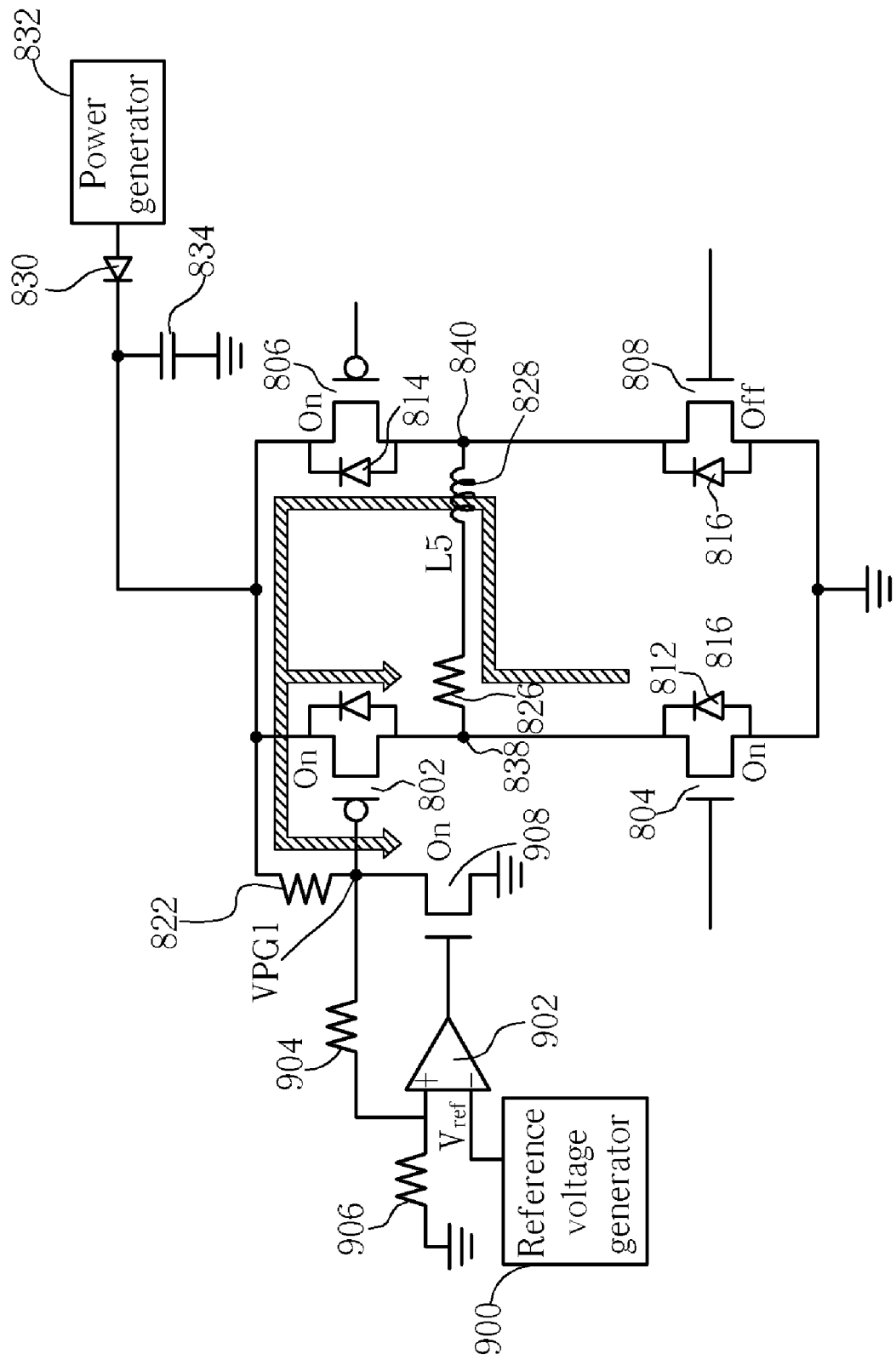
Figure 16:
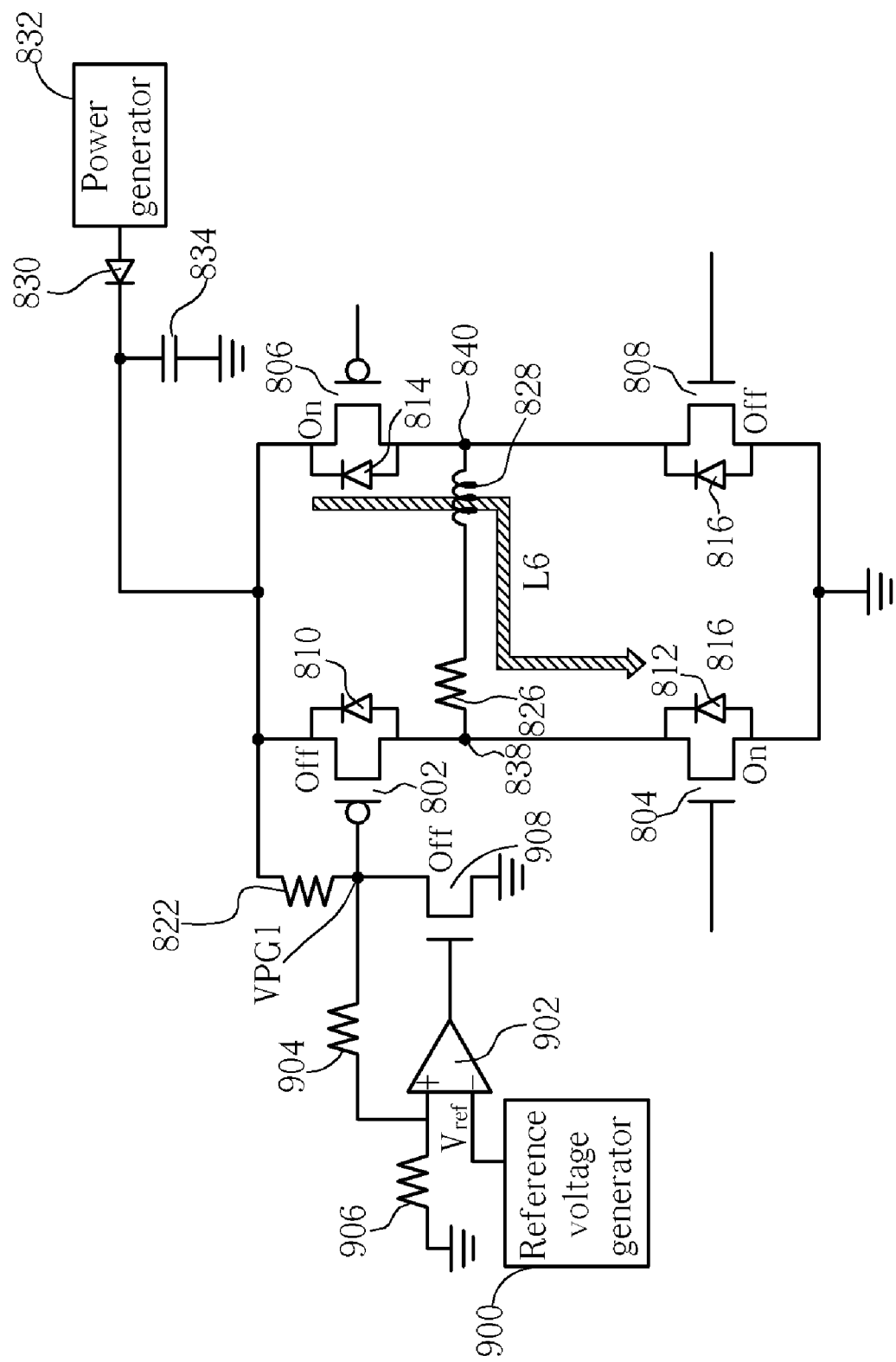

Please refer to FIG. 10 to FIG. 16. FIG. 10 depicts a schematic diagram of a time sequence of corresponding signals of the driving circuit 800. FIG. 11 to FIG. 16 depict schematic diagrams of current paths of the driving circuit 800 in different operating stages. FIG. 10, from top to bottom shows a sensing result PT_H of the Hall sensor 836, operating states PT_SW1, PT_SW2, PT_SW3, and PT_SW4 of the transistors 802, 804, 806, and 808, a current PT_L of the inductor 828, voltages PT_O1 and PT_O2 of the nodes 838 and 840, the source voltages VM of the transistors 802 and 806, and gate voltages VPG1 and VPG2 of the transistors 802 and 806, For clarity, operations of the driving circuit 800 can divide into seven stages: PT_S1, PT_S2, PT_S3, PT_S4, PT_S5, PT_S6, and PT_S7, as shown in FIG. 10. FIG. 11 shows a current path L1 of in the stage PT_S1, FIG. 12 shows a current path L2 of in the stage PT_S2, FIG. 13 shows a current path L3 of in the stage PT_S3 and the stage PT_S4, FIG. 14 shows a current path L4 of in the stage PT_S5, FIG. 15 shows a current path L5 of in the stage PT_S6, and FIG. 16 shows a current path L6 of in the stage PT_S7. The follows explain the operations of the driving circuit 800 in each stage, where FIG. 11 to FIG. 16 only depict partial circuits of the driving circuit 100 for simplicity.

Firstly, in the stage PT_S1, the controller 818 and 820 switch on the transistors 802 and 808 and switch off the transistors 804 and 806, so that the voltage PT_O1 of the node 838 is higher than the voltage PT_O2 of the node 840. The current outputted from the power generator 832 flows along the current path L1, from the node 838 to the node 840, so that the current PT_L is positive. Under this circumstance, the voltages VPG1 and VGP2 are smaller than the voltage Vclamp, so that the gate voltages of the transistors 908 and 918 in the active clamping circuits 850 and 852 are 0 Volt, meaning that the transistors 908 and 918 stay at a cut-off state and operations of the controllers 818 and 820 won't be changed.

Next, the magnetic pole of the rotor changing with rotations of the DC motor makes the sensing result PT_H of the Hall sensor 836 changed. The stage goes into the stage PT_S2. In the stage PT_S2, the controllers 818 and 820 switch off the transistors 802, 804, and 806 and switch on the transistor 808 so that current flows along the current path L2 from the diode 812 to the transistor 808 and ground. Therefore, before the DC motor changes the state, parts of the current PT_L drift to ground by the transistor 808, so as to prevent too much reverse current from drifting into the sources of the transistors 802 and 806. Similarly, under this circumstance, the transistors 908 and 918 stay in the cut-off state and operations of the controllers 818 and 820 won't be changed.

After undergoing the stage PT_S2, the operation of the driving circuit 800 is forward to the stage PT_S3. At this moment, the controllers 818 and 820 switch all the transistors 802, 804, 806, and 808 off. However, a residual current, flowing along the current path L3 from the diode 812 to the diode 814, increases the voltage VM due to the residual current drifting to the capacitor 834. After that, with stepping forward to the stage PT_S4, the controllers 818 and 820 switch on the transistors 804 and 806 and switch off the transistors 802 and 808, so that the voltage VM continues increasing. The stage PT_S5 starts when the voltage VPG1 reaches Vclamp.

In the stage PT_S5, the reverse current follows the current path L4 and drifts to the capacitor 834 and the active clamping circuit 850. The transistor 908 starts to sink current, so that the negative feedback establishes. The voltage VPG1 is fixed at Vclamp, while the voltage VM still continues increasing, leading a voltage Vsg1 between the source and the gate of the transistor 802 to keep increasing. When the voltage Vsg1 increases to a level enough for sinking the motor current, the motor current stops charging the capacitor 834. Step forward to the stage PT_S6.

In the stage PT_S6, the controllers 818 and 820 switch on the transistors 804 and 806 and switch off the transistors 802 and 808, but the reverse current switch on the transistors 802 and 908, so that the reverse current flows to ground along the current path L5. In other words, under this circumstance, the transistors 802 and 804 are switched on at the same time in order to speed up draining the reverse current. Note that, the present invention intends to switch on the upper and lower switches on the same bridge, so as to conduct the reverse current to ground. This action continues until a current PT_L of the inductor 828 almost goes down to zero. No more currents are provided to the transistors 802 and 908, so that the transistor 802 is switched off, current starts to flow from the node 840 to the node 838, and the capacitor 834 starts to discharge, continuously decreasing the voltage VM. When the voltage Vm decreases to the same voltage as VPG1, smaller than the voltage Vclamp, the transistor 908 is switched off, and the active clamping circuit 850 stops functioning and goes back to normal operations, which is the stage PT_S7.

Therefore, in accordance with FIG. 10 and FIG. 15, in the stage PT_S6, the residual current switches on the transistors 802 and 908, so that the reverse current can flow to ground via the transistors 802, 804, and 908. Therefore, in conditions of the higher rotation speed of the motor as well as the larger motor current, the present invention is capable of preventing the reverse current from increasing the voltage VM, which may cause the full-bridge circuit broken down. In other words, the driving circuit 800 can avoid the impact of the reverse current, so as to protect the DC motor.

In conclusion, the present invention utilizes the active clamping circuits to clamp the voltages of the input ends of the upper-bridge switches, so as to prevent the reverse current from increasing the voltages of the input ends of the upper-bridge switches, which may cause the full-bridge circuit burned down. Note that, via the active clamping circuits, the present invention is capable of fitly and safely switching on the upper and lower switches on the same bridge at the same time, so as to conduct the reverse current to ground. Note that, the reverse current does not increase the voltages of the input ends of the upper-bridge switches, which may burn down the circuits. Therefore, the reliability of the device operations can be increased so as to protect the DC motor and stabilize system operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit for switching direct current (DC) power comprising:
   a DC power generator for outputting DC power;
   a bridge circuit comprising a plurality of legs each comprising:
      an upper-bridge switch having an input end coupled to the DC power generator, an output end, and a control end, for conducting power received by the input end to the output end according to a first control signal of a plurality of control signals; and
      a lower-bridge switch having an input end coupled to the output end of the upper-bridge switch, an output end coupled to ground, and a control end, for conducting power received by the input end to the output end according to a second control signal of the plurality of control signals;
a control signal generator for generating the plurality of control signals for controlling each upper-bridge switch and lower-bridge switch of the bridge circuit; and
an active clamping module coupled to each upper-bridge switch of the plurality of legs of the bridge circuit for clamping voltages of input ends of the upper-bridge switches.

2. The driving circuit of claim 1, wherein the upper-bridge switch is a p-type metal oxide semiconductor (MOS) transistor, the input end of the upper-bridge switch is a source, the output end of the upper-bridge switch is a drain, and the control end of the upper-bridge switch is a gate.

3. The driving circuit of claim 2 further comprising a diode having an input end coupled to a base of the p-type MOS transistor and an output end coupled to the source of the p-type MOS transistor.

4. The driving circuit of claim 1, wherein the lower-bridge switch is a n-type MOS transistor, the input end of the lower-bridge switch is a drain, the output end of the lower-bridge switch is a source, and the control end of the lower-bridge switch is a gate.

5. The driving circuit of claim 4 further comprising a diode having an input end coupled to a base of the n-type MOS transistor and an output end coupled to the drain of the n-type MOS transistor.

6. The driving circuit of claim 1, wherein the active clamping module comprises a plurality of active clamping circuits each coupled to an input end of an upper-bridge switch of a leg in the bridge circuit, for clamping voltage of the input end of the upper-bridge switch.

7. The driving circuit of claim 1 further comprising a capacitor coupled between an output end of the DC power generator and ground.

8. A driving circuit for a direct current (DC) motor comprising:
a DC power generator for outputting a DC power;
a full bridge circuit comprising:
   a first upper-bridge switch having an input end coupled to the DC power generator, an output end coupled to a first end of a rotor coil of the DC motor, and a control end, for conducting power received by the input end to the output end according to a first control signal;
   a first lower-bridge switch having an input end coupled between the input end of the first upper-bridge switch and the first end of the rotor coil of the DC motor, an output end coupled to ground, and a control end, for conducting a power received by the input end to the output end according to a second control signal;
   a second upper-bridge switch having an input end coupled to the DC power generator, an output end coupled to a second end of the rotor coil of the DC motor, and a control end for conducting power received by the input end to the output end according to a third control signal; and
   a second lower-bridge switch having an input end coupled between the input end of the second upper-bridge switch and the second end of the rotor coil of the DC motor, an output end coupled to ground, and a control end for conducting power received by the input end to the output end according to a forth control signal;
a first resistor coupled between the input end and the control end of the first upper-bridge switch;
a second resistor coupled between the input end and the control end of the second upper-bridge switch;
a magnetic sensor for generating a magnetic pole position sensing signal according to magnetic pole changes of the rotor of the DC motor;
a control signal generator for generating the first control signal, the second control signal, the third control signal, and the forth control signal according to the magnetic pole position sensing signal generated by the magnetic sensor; and
an active clamping module coupled between a node between the control end of the first upper-bridge switch and the first resistor and a node between the control end of the second upper-bridge switch and the second resistor, for clamping voltage of the input end of the first upper-bridge switch and voltage of the input end of the second upper-bridge switch.

9. The driving circuit of claim 8, wherein the first upper-bridge switch is a p-type metal oxide semiconductor (MOS) transistor, the input end of the first upper-bridge switch is a source, the output end of first the upper-bridge switch is a drain, and the control end of the first upper-bridge switch is a gate.

10. The driving circuit of claim 9 further comprising a diode having an input end coupled to a base of the p-type MOS transistor and an output end coupled to the source of the p-type MOS transistor.

11. The driving circuit of claim 8, wherein the first lower-bridge switch is a n-type MOS transistor, the input end of the first lower-bridge switch is a drain, the output end of the first lower-bridge switch is a source, and the control end of the first lower-bridge switch is a gate.

12. The driving circuit of claim 11 further comprising a diode having an input end coupled to a base of the n-type MOS transistor and an output end coupled to the drain of the n-type MOS transistor.

13. The driving circuit of claim 8, wherein the second upper-bridge switch is a p-type MOS transistor, the input end of the second upper-bridge switch is a source, the output end of second the upper-bridge switch is a drain, and the control end of the second upper-bridge switch is a gate.

14. The driving circuit of claim 13 further comprising a diode having an input end coupled to a base of the p-type MOS transistor and an output end coupled to the source of the p-type MOS transistor.

15. The driving circuit of claim 8 wherein the second lower-bridge switch is a n-type MOS transistor, wherein the input end of the second lower-bridge switch is a drain, the output end of the second lower-bridge switch is a source, and the control end of the second lower-bridge switch is a gate.

16. The driving circuit of claim 15 further comprising a diode having an input end coupled to a base of the n-type MOS transistor and an output end coupled to the drain of the n-type MOS transistor.

17. The driving circuit of claim 8, wherein the active clamping module comprising:
a first active clamping circuit comprising:
   a first reference voltage generator for generating a first reference voltage;
   a first operational amplifier having a first input end coupled to the first reference voltage generator, a second input end, and an output end;
   a first voltage dividing resistor having one end coupled between the control end of the first upper-bridge switch and the first resistor, and the other end coupled to the second input end of the first operational amplifier;

a second voltage dividing resistor having one end coupled between the first voltage dividing resistor and the first operational amplifier, and the other end coupled to ground; and a first transistor having a drain coupled between the control end of the first upper-bridge switch and the first resistor, a source coupled to ground, and a gate coupled to the output end of the first operational amplifier; and a second active clamping circuit comprising:

a second reference voltage generator for generating a second reference voltage;

a second operational amplifier having a first input end coupled to the first reference voltage generator, a second input end, and an output end;

a third voltage dividing resistor having one end coupled between the control end of the second upper-bridge switch and the second resistor, and the other end coupled to the second input end of the second operational amplifier;

a forth voltage dividing resistor having one end coupled between the third voltage dividing resistor and the second operational amplifier, and the other end coupled to ground; and a second transistor having a drain coupled between the control end of the second upper-bridge switch and the second resistor, a source coupled to ground, and a gate coupled to the output end of the second operational amplifier.

18. The driving circuit of claim 8 further comprising a capacitor having one end coupled between the input end of the first upper-bridge switch and the input end of the second upper-bridge switch, and the other end coupled to ground.

19. The driving circuit of claim 8 further comprising a diode having an input end coupled to the DC power generator and an output end coupled between the input end of the first upper-bridge switch and the input end of the second upper-bridge switch.

* * * * *